United States Patent [19]

Miller

[11] 4,302,227
[45] Nov. 24, 1981

[54] BAFFLED MOISTURE SEPARATOR

[75] Inventor: Edward H. Miller, Rexford, N.Y.

[73] Assignee: General Electric Company, Schenectady, N.Y.

[21] Appl. No.: 153,670

[22] Filed: May 27, 1980

[51] Int. Cl.³ .............................................. B01D 50/00
[52] U.S. Cl. ......................................... 55/269; 55/318; 55/416; 55/447; 55/462; 122/34; 122/488; 122/491
[58] Field of Search ................................ 122/448–492, 122/34; 55/269, 318, 319, 447, 413, 416, 462

[56] References Cited

U.S. PATENT DOCUMENTS

| 691,485 | 1/1902 | Porbeck | 55/392 |
| 3,472,209 | 10/1969 | Roffler | 55/269 |
| 3,593,500 | 7/1971 | Ritland et al. | 122/488 |
| 3,667,430 | 6/1972 | Hubble et al. | 122/483 |
| 3,713,278 | 1/1973 | Miller et al. | 122/483 |
| 3,750,371 | 8/1973 | Gutman | 55/269 |
| 3,863,608 | 2/1975 | Yasugahira et al. | 122/483 |
| 4,015,562 | 4/1977 | Yousoufian | 55/269 |
| 4,016,835 | 4/1977 | Yardin et al. | 122/483 |
| 4,019,881 | 4/1977 | Hevzog et al. | 122/483 |

Primary Examiner—Bernard Nozick
Attorney, Agent, or Firm—Ormand R. Austin; John F. Ahern

[57] ABSTRACT

A moisture separator reheater combination includes specially located perforated baffles which function to reduce components of steam fluid velocity flow which are substantially parallel to the cylindrical axis of the moisture separator vessel. These baffles counteract the effects of transverse vortices which produce local pressure variations and adversely affect the efficiency of the moisture separator elements. The use of the baffles of the present invention improves the uniformity of steam flow through the moisture separator elements.

6 Claims, 3 Drawing Figures

BAFFLED MOISTURE SEPARATOR

BACKGROUND OF THE INVENTION

This invention relates to moisture separators and moisture separator reheaters and in particular to such devices in which inertial moisture separator elements are employed.

In some electrical power-generating systems, the quality of steam produced to drive a turbine-generator combination is not as high as desired. Following passage of this relatively low quality steam through the high-pressure stage of the turbine, it is often necessary to treat the exiting steam prior to introducing it into the intermediate or low-pressure sections of the turbine. This reconditioning generally involves separating out moisture from the steam and then, if desired, reheating the dried steam to a temperature more nearly approximating the temperature of the steam entering the high-pressure turbine stage. This function is carried out by a moisture separator or a combination of a moisture separator and reheater. U.S. Pat. No. 3,713,278 issued to Edward H. Miller, the inventor herein, and Stephen Chesmejef and assigned to the same assignee as the instant invention, describes a combination of a moisture separator and a reheater contained within the same unit. The contents of this patent are hereby incorporated herein by reference as background material for the present invention.

The function of moisture separation is generally carried out through a sequence of zig-zag shaped chevron plates, or "wiggle plates" as described in FIG. 5 of the aforementioned Miller patent. Such a configuration of wiggle plates is generally described as an inertial moisture separator since it is the inertia of the moisture within the steam that causes it to collect in the cul de sacs as shown. The moisture in these vertical cul de sacs then drains into a common trough from which the water is collected and cycled to other parts of the steam generation system. For more efficient operation of the inertial moisture separators, it is desirable that there be a relatively uniform pressure distribution between the various channels formed by the wiggle plates.

The importance of uniformity of flow into and through the moisture separator elements is recognized in U.S. Pat. No. 4,016,835, issued Apr. 12, 1979, to Abraham L. Yarden and Robert A. Weisberg. To provide the desired uniformity of flow, they appear to employ a perforated metal plate lying substantially parallel to the moisture separator banks. Fixed to this metal plate are solid baffles arranged in a staggered fashion acting to produce variable pressure drops to effect the desired uniformity. However, the presence of pressure drops generally acts to reduce the useful energy content of the steam. It is to be particularly noted in the patent to Yarden et al that the perforated plate lies in a direction parallel to the longitudinal or cylindrical axis of the cylindrical pressure vessel and that the variously shaped and staggered unperforated plates lie in a direction perpendicular to the perforated plate and parallel to the cylindrical axis of the pressure vessel.

SUMMARY OF THE INVENTION

In accordance with a preferred embodiment of the present invention, a moisture separator comprises a substantially cylindrical pressure-tight vessel having an inlet opening and an outlet opening and containing therein a pair of banks of inertial moisture separator elements disposed symmetrically along and about the axis of the vessel, and internal plate means for directing the flow of steam between the inlet opening and the outlet opening through the moisture separator elements. Most importantly, the moisture separator of the present invention further comprises baffle means disposed substantially perpendicular to the cylinder axis which function to reduce the components of steam velocity which are substantially parallel to the cylinder axis, this baffle means being disposed within the steam path immediately downstream of the inlet opening or openings. These baffles are preferably perforated and function to reduce unwanted transverse vortices which cause local pressure variation and result in wasted energy and inefficient operation. The moisture separator of the present invention also preferably includes an arcuate impringement baffle positioned immediately within the inlet openings to assist in the uniform distribution of wet steam along the inlet side of the moisture separator banks. Furthermore, the baffle means of the present invention may be employed not only with moisture separators operating by themselves but also in moisture separators and reheater combinations as disclosed in the aforementioned Miller patent.

Accordingly, it is an object of the present invention to provide a moisture separator or moisture separator reheater combination operating with increased efficiency.

It is a further object of the present invention to provide a means for reducing transverse vortices in the steam path immediately upsteam of the moisture separator elements.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the following drawings in which:

DETAILED DESCRIPTION OF THE INVENTION

Figure 1:
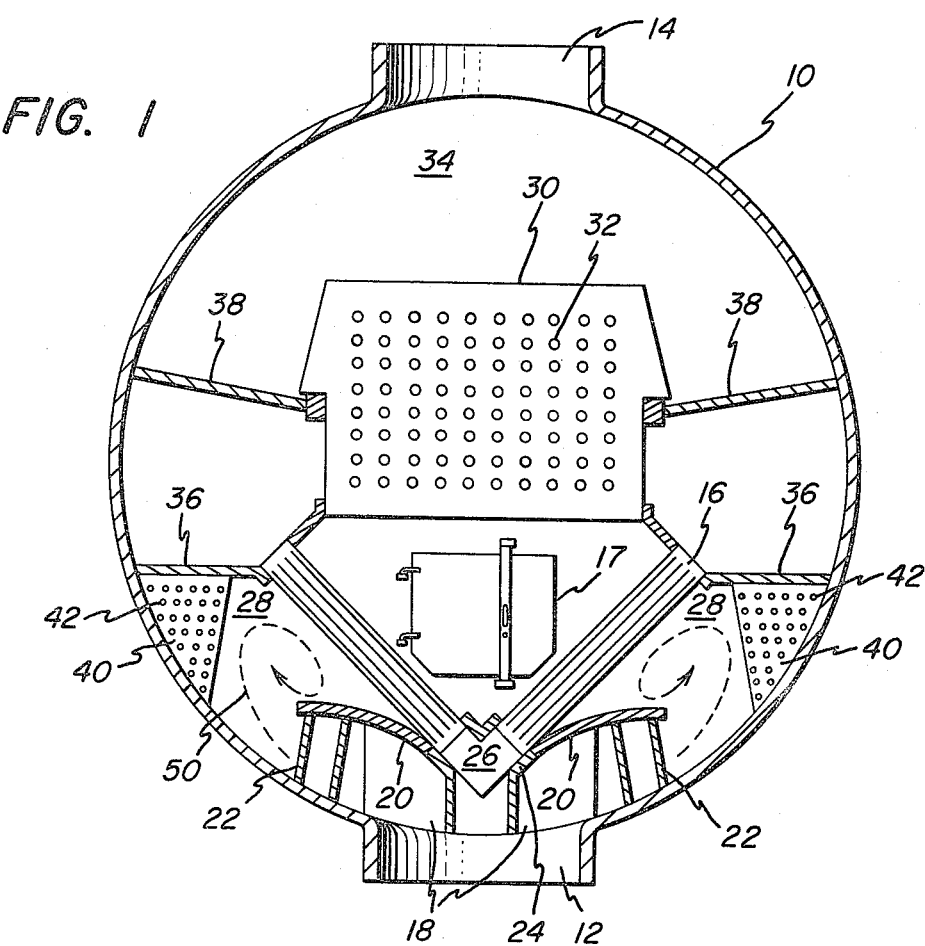
FIG. 1 is a partial transverse cross-sectional view looking along the axis of the cylindrical pressure vessel of a moisture separator reheater made in accordance with the present invention.

FIG. 1 is a transverse partial cross-sectional view through a moisture separator reheater of the present invention in which baffles 40 are advantageously provided to reduce the effects of transverse vortices in the steam flow. A moisture separator reheater of the present invention comprises a substantially cylindrical pressure-tight vessel 10 which has at least one inlet opening 12 and at least one outlet opening 14 for the passage of steam to be dried or dried and reheated. The device functions by admitting moisture laden steam through inlet 12 and rejecting dry, heated steam through outlet opening 14. Steam entering the inlet 12 encounters a pair of semi-circular, arcuate impingement baffles 20 which operate to distribute the steam flow through inlet plenum 28, as uniformly as possible. Additionally, aided by the arcuate nature of the impingement baffles 20, a vertical vortex 50 is imparted to the steam flow. This vertical, axial vortex is useful in the extraction of moisture from the steam because of the fluid flow velocities it tends to impart in the vicinity of the entrance to the inertial moisture separator banks 16. These moisture separator banks 16 typically comprise wiggle plate assemblies as seen in the aforementioned patent to Miller et al. The inlet steam also encounters secondary baffles 18 which further function to produce a uniform distribution of the wet inlet steam. The impingement baffle 20 is supported, for example, by pipe supports 22. A better appreciation of the shape, function and location of baffles 18 and 20 may be had from the view shown in FIG. 2, to be discussed below. The moisture from the inertial moisture separators 16 drains into trough 26 formed by the moisture separators formed centrally by the moisture separators and angle plate 24 extending longitudinally along the bottom line of the separator. Since it is essential for efficient operation that all of the moisture laden steam pass through the moisture separators 16, longitudinally extending plates 36 on either side of the V-shaped moisture separator banks are installed so that inlet plenum 28 is pressure-tight.

This pressure tightness is also desirable for longitudinally extending plates 38 which support the bundle 30 of reheat tubes 32 which function to raise the temperature of the dried steam exhausted from the moisture separators 16. Thus, longitudinal plates 38, vessel 10 and reheat tube bundle 30 define an outlet plenum 34 through which the dried and reheated steam passes to outlet 14.

The reheat tubes 32 may be either the horizontal or vertically configured tubes. These reheat tubes do not affect the function of the present invention. In fact, the reheat tube bundle 30 is shown here basically for completeness of description; however, the baffles employed in the present invention are equally effective in promoting the efficiency of moisture separators alone in which no reheat function is performed.

If desired, access door 17 may be provided for convenience. Also, the longitudinal plenums to the left and right of the reheat tube bundle 30 in FIG. 1 may be pressurized for the purposes of equalization.

The baffles 40 preferably comprise approximately triangular sheets having perforations 42. In one particular embodiment the baffle employed has a horizontal dimension of approximately 19 inches, a vertical dimension of approximately 27 inches and a third edge comprising a circular arc with a radius of 72 inches. In this same embodiment, the perforations were holes having a diameter of 1¼ inches spaced with their centers 1⅜ inches apart, thus resulting in a surface that was 50 percent perforated. In one test in which these baffles were employed in efforts to improve efficiency, it was observed that the energy efficiency of the moisture separator reheater at full load improved from 68 percent to 93 percent. Some of this improvement is attributed to the use of the baffles 40. The baffles employed have the advantage that they are not only employable in original manufacture but may also be easily retrofitted to existing units with little or no other modifications.

Figure 2:
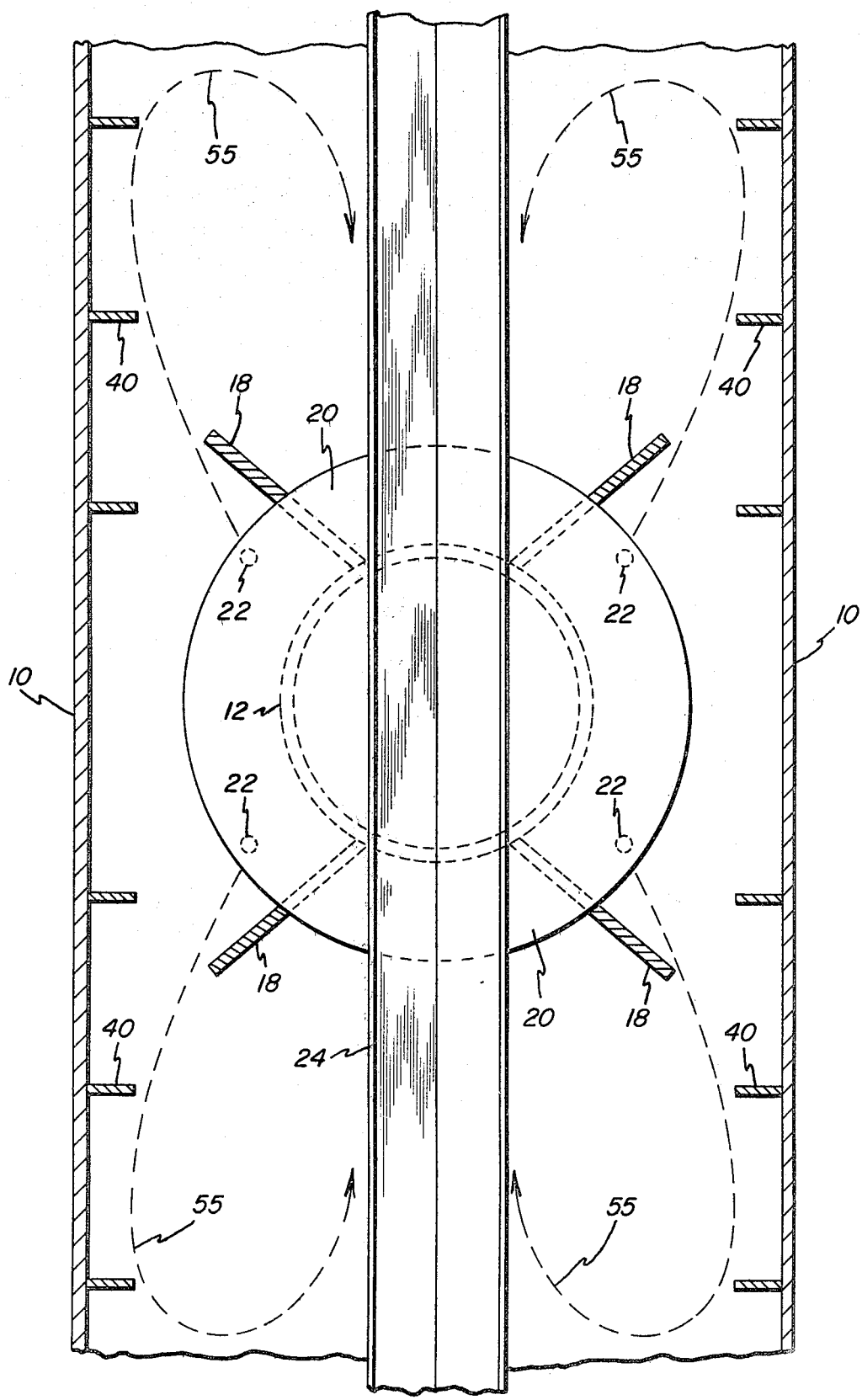
FIG. 2 is a partial cross-sectional plan view looking out through the inlet opening of the moisture separator reheater shown in FIG. 1 with the reheat tubes and moisture separator banks removed for clarity.

The operation of the baffles 40 is seen at least in part in FIG. 1 in which it is seen that the baffles promote the stability of vortex 50 as shown. However, an even a more important function of the baffles is illustrated in FIG. 2 in which it is seen that the formation of transverse vortices 55 is inhibited by their presence. It is to be noted that with respect to the view in FIG. 2, reheater tube bundle 30, longitudinal plates 36 and 38 and moisture separators 16 are not shown so that a better view of the inlet opening may be provided along with a better understanding of the interaction of the various baffling members provided. In particular in FIG. 2 there is shown the two semicircular portions of the arcuate impingement baffle 20 supported by pipe supports 22 between it and the floor of the vessel 10. Also shown are secondary baffles 18 functioning to facilitate the longitudinal distribution of the steam flow. Secondary baffles 18 are likewise affixed to the floor of pressure vessel 10 and also to baffle 20, for example, by welds. Likewise, impingement baffle 20 is affixed to trough 24 preferably by welds. Inlet opening 12 can be seen in phantom view beneath baffle 20.

As can be seen from FIGS. 1 and 2, the baffles 40 are affixed to the interior of the vessel surface, as by welding, and are mounted so as to be substantially perpendicular to the central cylindrical axis of the vessel 10. While the baffles too are mountable in various positions along the lower inside wall of pressure vessel 10, the baffle plates 40 are preferably affixed to the vessel wall at a high point along the vessel wall close to the moisture separator banks. Since the moisture separator banks are preferably configured in a V-shape, this means that the baffles 40 are therefore preferably disposed nearest the widest part of the V. Furthermore, these plates 40 preferably extend the length of the vessel on either side thereof substantially as shown in the Figures.

Figure 3:
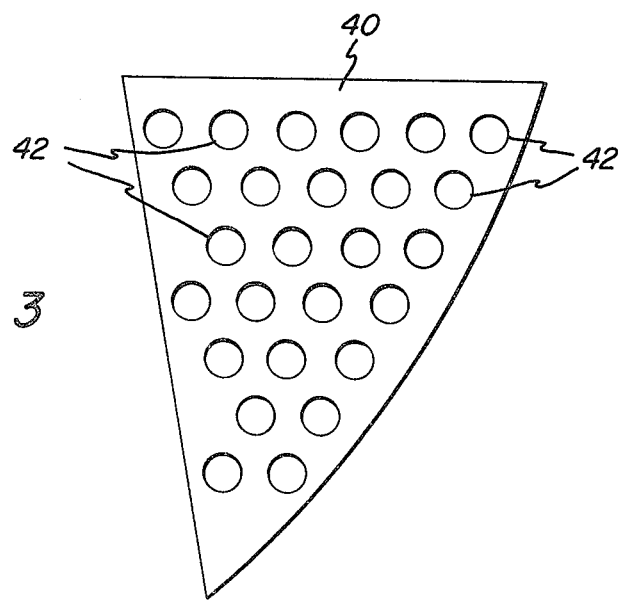
FIG. 3 is an elevation view of a perforated baffle employed in the present invention.

FIG. 3 illustrates the typical size and shape of the perforated baffles employed. It is to be particularly noted from FIG. 3 that it is not desirable that a hole be on an edge of the baffle, so as to avoid any unnecessary weakness or vibration that might result.

While the invention as shown describes a moisture separator reheater having bottom inlets and top outlets and V-shaped moisture separator banks, other configurations employing the present invention are possible. The significant feature of the baffling arrangement of the present invention is that transverse vortices 55 are significantly reduced so as to increase the efficiency of the device. These transverse vortices are undesirable and operate to produce pressure differences between various paths through the moisture separator elements. This is undesirable since it adversely effects the efficiency and the ability to perform a thorough extraction of moisture. The objects of the present invention are carried out without employing perforated plates parallel to the moisture separator banks nor does it employ plates tending to cause undesirable pressure drops.

From the above it may be appreciated that the moisture separator or moisture separator reheater combination of the present invention effectively provides for the reduction of transverse vortices and significantly enhances the overall efficiency of the moisture separation process. The efficiency robbing tendencies of these vortices have not been heretofore appreciated nor has there been any appreciation of a baffling structure which operates to reduce these transverse vortices. Thus, not only does the present invention provide an improved moisture separator reheater but also renders it possible to easily retrofit existing units so as to increase their overall efficiency.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A moisture separator for removing moisture from steam flowing therethrough comprising:
   a horizontal substantially cylindrical, pressure-tight vessel having at least one steam inlet opening at the bottom thereof, and at least one steam outlet opening at the top thereof;
   a pair of banks of inertial moisture separator elements disposed within said vessel;
   structure defining means for directing the flow of steam between said at least one inlet opening and said at least one outlet opening through said inertial moisture separator elements;
   an impingement baffle opposed from said steam inlet within said vessel for promoting a first vortical flow pattern in steam entering said inertial moisture separator, said first flow pattern having a vortical axis substantially parallel to the longitudinal axis of said vessel; and
   a plurality of spaced-apart baffle means affixed to the inside of said vessel substantially perpendicular to the longitudinal axis thereof for inhibiting a second vortical flow pattern in steam entering said inertial moisture separator, said second flow pattern having a vortical axis substantially transverse to the longitudinal axis of said vessel.

2. The moisture separator of claim 1 in which said moisture separator elements drain into a moisture collecting trough extending longitudinally along the vessel.

3. The moisture separator apparatus of claim 1 further including reheat means disposed in the steam flow path between the inertial moisture separator banks and said at least one outlet opening.

4. The moisture separator of claim 1 in which said baffle means comprise perforated plates projecting from the internal surface of said vessel.

5. The moisture separator of claim 2 in which said baffle means comprise perforated, approximately triangular plates.

6. The moisture separator of claim 5 in which said moisture separator banks are disposed within said cylindrical vessel in a V-shaped configuration and said triangular plates are disposed along the internal vessel wall nearest the widest part of the V-shaped moisture separator banks.

* * * * *